US012748065B2

(12) United States Patent
Akimoto et al.

(10) Patent No.: US 12,748,065 B2
(45) Date of Patent: Sep. 29, 2026

(54) MULTI-FILM RESISTIVE GAS SENSOR AND SYSTEM

(71) Applicant: KABUSHIKI KAISHA TOSHIBA, Tokyo (JP)

(72) Inventors: Yosuke Akimoto, Yokohama (JP); Akira Fujimoto, Kawasaki (JP); Yoshihiko Kurui, Chigasaki (JP); Ping Wang, Fujisawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 281 days.

(21) Appl. No.: 18/734,045

(22) Filed: Jun. 5, 2024

(65) Prior Publication Data

US 2025/0076238 A1 Mar. 6, 2025

(30) Foreign Application Priority Data

Aug. 29, 2023 (JP) ................................ 2023-139218

(51) Int. Cl.
*G01N 27/18* (2006.01)
*G01N 27/04* (2006.01)

(52) U.S. Cl.
CPC ........... *G01N 27/18* (2013.01); *G01N 27/045* (2013.01)

(58) Field of Classification Search
CPC ...... G01N 27/18; G01N 27/16; G01N 33/005; G01N 2027/222; G01N 33/004;
(Continued)

(56) References Cited

U.S. PATENT DOCUMENTS 11,567,025 B2 1/2023 Matsuo et al.
12,461,052 B2 * 11/2025 Hayashi ............... G01N 33/005
(Continued)

FOREIGN PATENT DOCUMENTS

JP 2022-22828 A 2/2022
JP 2022-127753 A 9/2022
(Continued)

OTHER PUBLICATIONS

Japan Patent Office, Office Action in JP App. No. 2023-139218 (Dec. 24, 2025).
(Continued)

*Primary Examiner* — Andre J Allen
(74) *Attorney, Agent, or Firm* — Finnegan, Henderson, Farabow, Garrett & Dunner, LLP

(57) ABSTRACT

According to one embodiment, a sensor includes an element section. The element section includes a base including a first region, a second region and a third region, a first element fixed to the first region, a second element fixed to the second region, and a third element fixed to the third region. The first element includes a first fixed portion fixed to the first region, and a first film portion supported by the first fixed portion. The first film portion includes a first resistance member and a first layer including a first material. The second element includes a second fixed portion fixed to the second region, and a second film portion supported by the second fixed portion. The third element includes a third fixed portion fixed to the third region, and a third film portion supported by the third fixed portion.

20 Claims, 9 Drawing Sheets

(58) Field of Classification Search
CPC .... G01N 27/128; G01N 27/12; G01N 27/227; G01N 27/028; G01N 27/045; G01N 33/0031; G01N 33/0047; G01N 33/0049; G01N 25/18; G01N 27/04; G01N 27/22; G01N 27/221; G01N 27/226; G01N 33/0016; G01N 33/0027; G01N 27/125; G01N 33/0054
See application file for complete search history.

(56) References Cited

U.S. PATENT DOCUMENTS

| | | | | |
|---|---|---|---|---|
| 12,613,207 | B2 * | 4/2026 | Akimoto | G01N 27/04 |
| 2019/0086377 | A1 * | 3/2019 | Ikehashi | G01N 27/221 |
| 2019/0162694 | A1 * | 5/2019 | Hayashi | G01N 27/4074 |
| 2021/0293735 | A1 | 9/2021 | Matsuo et al. | |
| 2022/0011254 | A1 | 1/2022 | Hayashi | |
| 2022/0268723 | A1 | 8/2022 | Hayashi | |
| 2023/0077493 | A1 | 3/2023 | Wang et al. | |
| 2023/0147680 | A1 | 5/2023 | NakaMats | |
| 2024/0068973 | A1 * | 2/2024 | Hayashi | G01N 27/227 |
| 2024/0201114 | A1 * | 6/2024 | Akimoto | G01N 25/18 |
| 2024/0295514 | A1 * | 9/2024 | Akimoto | G01N 27/04 |
| 2026/0009758 | A1 * | 1/2026 | Akimoto | G01N 27/12 |

FOREIGN PATENT DOCUMENTS

| | | | |
|---|---|---|---|
| JP | 2022-183341 | A | 12/2022 |
| JP | 7188445 | B2 | 12/2022 |
| JP | 2023-41615 | A | 3/2023 |
| WO | WO 2020/031517 | A1 | 2/2020 |

OTHER PUBLICATIONS

Figaro, "Operating Principle," https://www.figaro.co.jp/en/technicalinfo/principle/catalytic-type.html, 2 pages (2018).

Thermic Science and Technology, "Thermal conductivity of gases," https://www.netugakujijutu.com/tech/tc_gas/, 2 pages, and machine translation, 3 pages.

Nikki-Universal Co., Ltd., "Ammonia (NH3) and Organic Nitrogen Destruction Catalysts," https://www.n-u.co.jp/en/products/environmental-catalyst-exhaust-gas-treatment/nh3-destruction/, 2 pages (2020).

* cited by examiner

MULTI-FILM RESISTIVE GAS SENSOR AND SYSTEM

CROSS-REFERENCE TO RELATED APPLICATIONS

This application is based upon and claims the benefit of priority from Japanese Patent Application No. 2023-139218, filed on Aug. 29, 2023; the entire contents of which are incorporated herein by reference.

FIELD

Embodiments described herein relate generally to a sensor and a sensor system.

BACKGROUND

For example, there are sensors for detecting gas. It is desired to improve the characteristics of sensors.

DETAILED DESCRIPTION

Figure 1:
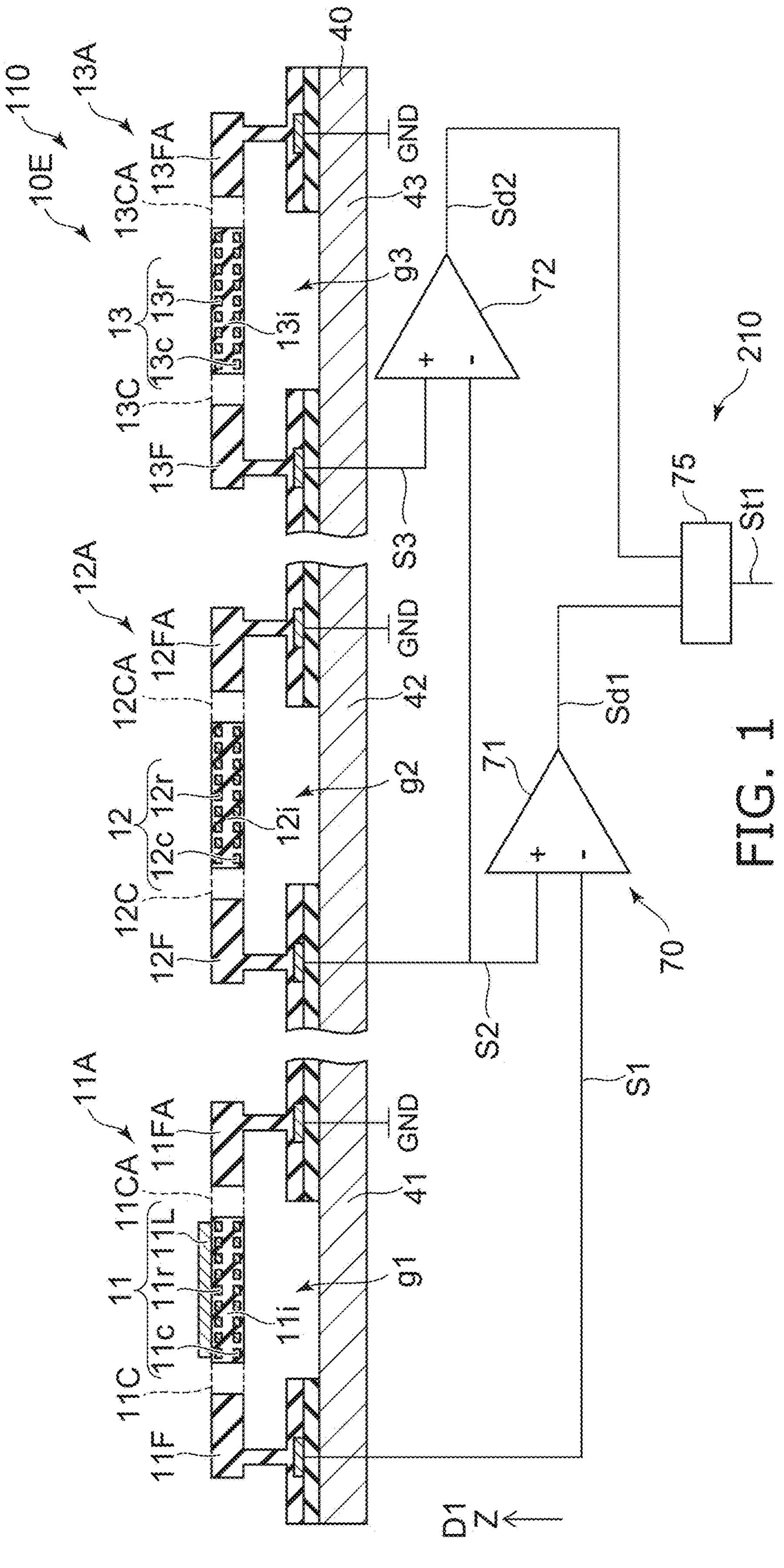
FIG. 1 is a schematic cross-sectional view illustrating a sensor according to a first embodiment.

According to one embodiment, a sensor includes an element section. The element section includes a base including a first region, a second region and a third region, a first element fixed to the first region, a second element fixed to the second region, and a third element fixed to the third region. The first element includes a first fixed portion fixed to the first region, and a first film portion supported by the first fixed portion. The first film portion includes a first resistance member and a first layer including a first material. The second element includes a second fixed portion fixed to the second region, and a second film portion supported by the second fixed portion. The second film portion includes a second resistance member. The third element includes a third fixed portion fixed to the third region, and a third film portion supported by the third fixed portion. The third film portion includes a third resistance member. The second film portion and the third film portion satisfy at least one of a first condition or a second condition. In the first condition, the second film portion and the third film portion do not include the first layer. In the second condition, the second film portion includes a second layer, and a second material of the second layer is different from the first material. In the second condition, the third film portion includes a third layer, and a third material of the third layer is same as the second material.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic cross-sectional view illustrating a sensor according to a first embodiment.

Figure 2:
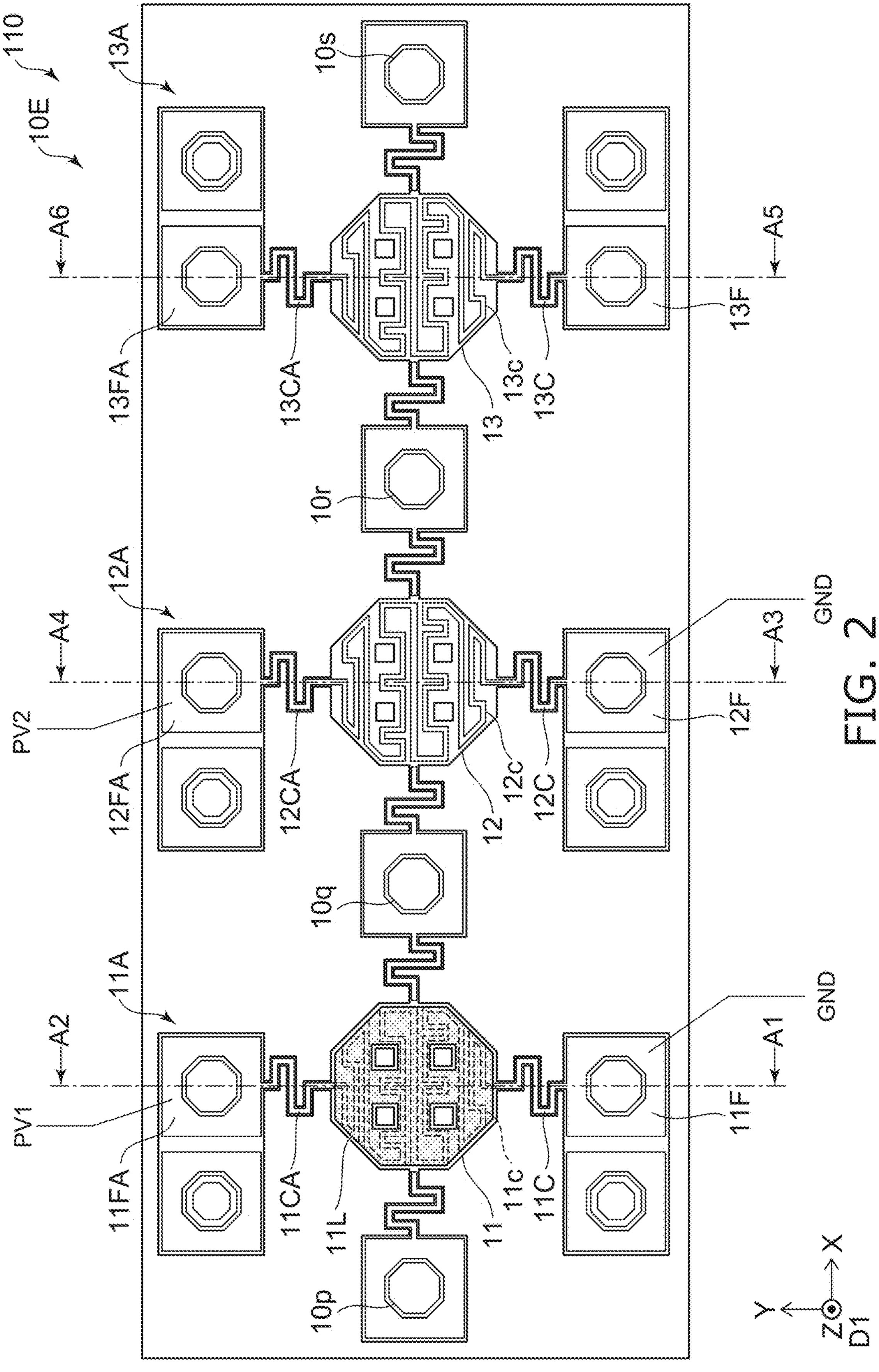
FIG. 2 is a schematic plan view illustrating the sensor according to the first embodiment.
Figure 3:
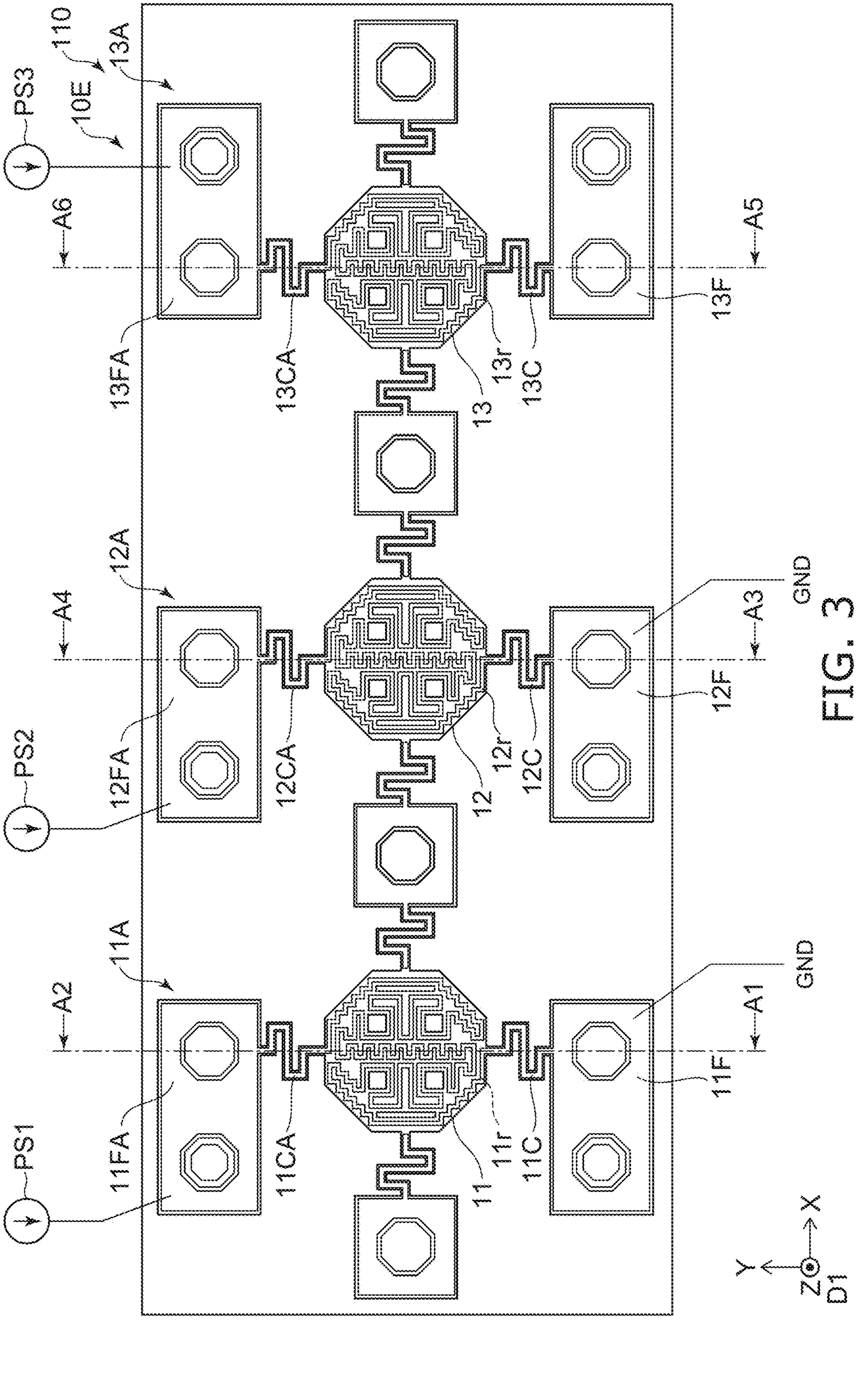
FIG. 3 is a schematic plan view illustrating the sensor according to the first embodiment.

FIGS. 2 and 3 are schematic plan views illustrating the sensor according to the first embodiment.

FIG. 1 illustrates cross sections taken along the lines A1-A2, A3-A4, and A5-A6 in FIGS. 2 and 3.

As shown in FIG. 1, a sensor 110 according to the embodiment includes an element section 10E. The element section 10E includes a base 40. The base 40 includes a first region 41, a second region 42 and a third region 43. The element section 10E further includes a first element 11A, a second element 12A, and a third element 13A. The first element 11A is fixed to the first region 41. The second element 12A is fixed to the second region 42. The third element 13A is fixed to the third region 43.

At least two of the first region 41, the second region 42, and the third region 43 may be separated from each other. At least two of the first region 41, the second region 42, and the third region 43 may be continuous with each other. The boundaries between these regions can be clear or unclear. The base 40 may be, for example, a substrate. The base 40 may include, for example, a semiconductor substrate (e.g., a silicon substrate). The base 40 may include electrical circuitry. The electrical circuit may include transistors and the like.

The first element 11A includes a first fixed portion 11F fixed to the first region 41 and a first film portion 11 supported by the first fixed portion 11F. The first film portion 11 includes a first resistance member 11*r* and a first layer 11L including a first material. For example, a first gap g1 may be provided between the first region 41 and the first film portion 11.

The second element 12A includes a second fixed portion 12F fixed to the second region 42 and a second film portion 12 supported by the second fixed portion 12F. The second film portion 12 includes a second resistance member 12*r*. A second gap g2 may be provided between the second region 42 and the second film portion 12.

The second film portion 12 does not include the first layer 11L. Alternatively, as described below, the second film portion 12 may include a second layer 12L (see FIG. 6). In this case, a second material of the second layer 12L is different from the first material. In the sensor 110, the second film portion 12 does not include the first layer 11L and does not include the second layer 12L.

The third element 13A includes a third fixed portion 13F fixed to the third region 43, and a third film portion 13 supported by the third fixed portion 13F. The third film portion 13 includes a third resistance member 13*r*. A third gap g3 may be provided between the third region 43 and the third film portion 13.

The third film portion 13 does not include the first layer 11L. Alternatively, as described below, the third film portion 13 may include a third layer 13L (see FIG. 6). In this case, a third material of the third layer 13L is the same as the second material. In the sensor 110, the third film portion 13 does not include the first layer 11L and does not include the third layer 13L.

For example, the second film portion 12 and the third film portion 13 may satisfy at least one of a first condition or a second condition. Under the first condition, the second film portion 12 and the third film portion 13 do not include the first layer 11L. Under the second condition, the second film portion 12 includes the second layer 12L, and the second material of the second layer 12L is different from the first material. Under the second condition, the third film portion 13 includes the third layer 13L, and the third material of the third layer 13L is the same as the second material.

For example, the first material of the first layer 11L includes at least one selected from the group consisting of Pt and Pd. These materials, for example, function as catalysts. The first layer 11L is a metal film. This metal film may include other elements (metals) in addition to at least one selected from the group consisting of Pt and Pd, for example.

In one example, the temperature of the first film portion 11 and the temperature of the second film portion 12 increase. The temperature increase may be based on, for example, irradiation with electromagnetic waves such as laser light or Joule heat. The method of increasing the temperature is arbitrary. There is no need to intentionally increase the temperature of the third film portion 13. In the embodiment, power may be supplied 10 to the resistive member to increase its temperature.

In one example, the temperature of the first film portion 11 including the first layer 11L changes depending on a state of the detection target (for example, the concentration of gas) existing around the element section 10E. The temperature of the first resistance member 11*r* changes depending on the state of the detection target. On the other hand, the temperature of the second film portion 12 that does not include the first layer 11L is different from the temperature of the first film portion 11. By comparing a signal obtained from the first resistance member 11*r* and a signal obtained from the second resistance member 12*r*, the state of the detection target that can act on the first layer 11L can be detected. For example, the concentration of a gas that can react with the first layer 11L can be detected.

On the other hand, by comparing the signal obtained from the second resistance member 12*r* and a signal obtained from the third resistance member 13*r*, the influence of unintended temperature fluctuations is suppressed. According to the embodiment, the detection target can be detected with high accuracy. According to the embodiment, a sensor with improved characteristics can be provided.

As shown in FIG. 1, the sensor 110 may further include a detector 70. For example, the detector 70 includes a first differential circuit 71 and a second differential circuit 72. In the first operation, the first differential circuit 71 is configured to output a first differential signal Sd1 corresponding to a first difference between a first signal S1 obtained from the first resistance member 11*r* and a second signal S2 obtained from the second resistance member 12*r*.

The second differential circuit 72 is configured t output a second differential signal Sd2 corresponding to a second difference between the second signal S2 obtained from the second resistance member 12*r* and a third signal S3 obtained from the third resistance member 13*r* in the second operation.

The first difference signal Sd1 can change depending on a concentration of a first gas present around the element section 10E. The first gas includes at least one selected from the group consisting of ammonia, methane, and hydrogen. The first gas corresponds to the detection target.

The second difference signal Sd2 can change depending on a concentration of a second gas present around the element section 10E. The second gas includes at least one selected from the group consisting of carbon dioxide, ammonia, methane, and hydrogen.

The first operation and the second operation described above correspond to a detection operation of the detection target. The detector 70 increases the temperature of the film portion during the detection operation.

For example, as shown in FIG. 1, the first film portion 11 may further include a first conductive member 11*c*. The second film portion 12 may further include a second conductive member 12*c*. These conductive members function as heaters. For example, the temperature of the film portion increases by Joule heat.

As shown in FIG. 2, the detector 70 supplies a first power PV1 to the first conductive member 11*c* in the first operation described above. In the first operation described above, the detector 70 supplies a second power PV2 to the second conductive member 12*c*. These powers cause the temperature of the first film portion 11 and the temperature of the second film portion 12 to rise. In the first film portion 11, the first layer 11L whose temperature has increased reacts with the detection target. For example, the temperature of the first film portion 11 increases due to the reaction. For example, when the first gas described above (at least one selected from the group consisting of ammonia, methane, and hydrogen) is present as the detection target gas, the temperature of the first film portion 11 changes according to the concentration of the first gas.

For example, the temperature of the first resistance member 11*r* when the concentration of the first gas is high is higher than the temperature of the first resistance member 11*r* when the concentration of the first gas is low. The first element 11A functions, for example, as a combustion type gas sensor (for example, a catalytic combustion type gas sensor).

On the other hand, the detector 70 supplies the second power PV2 to the second conductive member 12*c* in the first operation. The temperature of the second film portion 12 increases. The temperature of the second film portion 12 is affected by heat conduction due to the detection target existing around the second film portion 12. For example, when a gas with high thermal conductivity is present, heat is dissipated and the temperature of the second film portion 12 becomes low.

For example, the thermal conductivity of carbon dioxide and ammonia is lower than the thermal conductivity of air. When the second gas incudes these gases, the temperature of the second resistance member 12*r* when the second gas concentration is high is higher than the temperature of the second resistance member 12*r* when the second gas concentration is low.

For example, the thermal conductivity of hydrogen and methane is higher than the thermal conductivity of air. When the second gas includes these gases, the temperature of the second resistance member 12*r* in a state where the concentration of the second gas is high is lower than the temperature of the second resistance member 12*r* in a state where the concentration of the second gas is low.

By evaluating the second signal S2 obtained from the second resistance member 12*r*, the temperature of the second resistance member 12*r* can be detected. Thus, the concentration of the second gas can be detected.

Power may not be supplied to the third film portion 13. The temperature of the third film portion 13 does not substantially change. By detecting the difference between the third signal S3 obtained from the third resistance member 13*r* included in the third film portion 13 and the second signal S2, for example, the influence of changes in ambient temperature can be suppressed. It becomes possible to detect the detection target with higher accuracy.

In the embodiment, the second element 12A functions as a thermally conductive gas sensor. The third element 13A functions as a reference sensor.

As shown in FIG. 1, the third film portion 13 may further include a third conductive member 13*c*. The detector 70 does not supply power to the third conductive member 13*c* in the second operation described above. By providing the third conductive member 13*c* to which no power is supplied, the difference between the heat capacity of the third film portion 13 and the heat capacity of the second film portion 12 can be reduced. The difference can be substantially eliminated. Thereby, the third element 13A can function more effectively as a reference sensor.

For example, in a first reference example, a combustion gas sensor and a first reference sensor for the combustion gas sensor are provided. In the first reference example, a thermally conductive gas sensor and a second reference sensor for the thermally conductive gas sensor are provided. In the first reference example, since four sensors are provided, it is difficult to miniaturize the sensors. In contrast, in the embodiment, three sensors are used. Thereby, miniaturization is easy.

As shown in FIG. 1, a first direction D1 from the first region 41 to the first film portion 11 is defined as a Z-axis direction. As shown in FIGS. 2 and 3, one direction perpendicular to the Z-axis direction is an X-axis direction. A direction perpendicular to the Z-axis direction and the X-axis direction is defined as a Y-axis direction.

The first region 41, the second region 42, and the third region 43 extend along the X-Y plane. The first film portion 11, the second film portion 12, and the third film portion 13 extend along the X-Y plane. The planar shapes of these film portions are arbitrary.

As shown in FIG. 1, the first resistance member 11*r* is provided between the first region 41 and the first layer 11L in the first direction D1. The first layer 11L easily comes into contact with the detection target gas. Higher sensitivity can be easily obtained.

In the first direction D1, at least a part of the first layer 11L may overlap the first resistance member 11*r*. Temperature changes due to the action of the first layer 11L are efficiently transmitted to the first resistance member 11*r*.

As shown in FIG. 1, the first film portion 11 may include a first insulating member 11*i*. The first insulating member 11*i* is provided around the first resistance member 11*r* and the first conductive member 11*c*. The first layer 11L may be provided on the first insulating member 11*i*.

The second film portion 12 may include a second insulating member 12*i*. The second insulating member 12*i* is provided around the second resistance member 12*r* and the second conductive member 12*c*. The third film portion 13 may include a third insulating member 13*i*. The third insulating member 13*i* is provided around the third resistance member 13*r* and the third conductive member 13*c*. The first insulating member 11*i*, the second insulating member 12*i*, and the third insulating member 13*i* may include, for example, at least one selected from the group consisting of silicon and aluminum, and at least one selected from the group consisting of nitrogen and oxygen. These insulating members may include, for example, SiN.

As shown in FIG. 1, the first element 11A may include a first connect portion 11C. One end of the first connect portion 11C is connected to the first fixed portion 11F. Another end of the first connect portion 11C is connected to the first film portion 11. The first film portion 11 may be supported by the first fixed portion 11F via the first connect portion 11C.

The second element 12A may include a second connect portion 12C. One end of the second connect portion 12C is connected to the second fixed portion 12F. Another end of the second connect portion 12C is connected to the second film portion 12. The second film portion 12 may be supported by the second fixed portion 12F via the second connect portion 12C.

The third element 13A may include a third connect portion 13C. One end of the third connect portion 13C is connected to the third fixed portion 13F. Another end of the third connect portion 13C is connected to the third film portion 13. The third film portion 13 may be supported by the third fixed portion 13F via the third connect portion 13C.

As shown in FIG. 1, the first element 11A may include a first other fixed portion 11FA and a first other connect portion 11CA. The first other fixed portion 11FA is fixed to the first region 41. One end of the first other connect portion 11CA is connected to the first other fixed portion 11FA. Another end of the first other connect portion 11CA is connected to the first film portion 11.

As shown in FIG. 1, the second element 12A may include a second other fixed portion 12FA and a second other connect portion 12CA. The second other fixed portion 12FA is fixed to the second region 42. One end of the second other connect portion 12CA is connected to the second other fixed portion 12FA. Another end of the second other connect portion 12CA is connected to the second film portion 12.

As shown in FIG. 1, the third element 13A may include a third other fixed portion 13FA and a third other connect portion 13CA. The third other fixed portion 13FA is fixed to the third region 43. One end of the third other connect portion 13CA is connected to the third other fixed portion 13FA. Another end of the third other connect portion 13CA is connected to the third film portion 13.

As shown in FIGS. 2 and 3, the first film portion 11 may be further supported by a first support portion 10*p* and a second support portion 10*q*. The second film portion 12 may be further supported by a second support portion 10*q* and a third support portion 10*r*. The third film portion 13 may be further supported by the third support portion 10*r* and the fourth support portion 10*s*.

As shown in FIGS. 2 and 3, the first connect portion 11C, the second connect portion 12C, the third connect portion 13C, the first other connect portion 11CA, the second other connect portion 12CA, and the third other connect portion 13CA. may have a meander structure.

FIG. 2 illustrates the planar shapes of the first layer 11L, the first conductive member 11*c*, the second conductive member 12*c*, and the third conductive member 13*c*. The planar shapes of the first conductive member 11*c*, the second conductive member 12*c*, and the third conductive member 13*c* may be meandering.

FIG. 3 illustrates the planar shapes of the first resistance member 11*r*, the second resistance member 12*r*, and the third resistance member 13*r*. The planar shapes of the first resistance member 11*r*, the second resistance member 12*r*, and the third resistance member 13*r* may be meandering.

As shown in FIG. 3, in the detection operation, a detection current may be supplied from a first current source PS1 to the first resistance member 11*r*. In the detection operation, a detection current may be supplied to the second resistance member 12*r* from a second current source PS2. In the detection operation, a detection current may be supplied to the third resistance member 13*r* from a third current source PS3. These current sources may be included in the detector 70. The voltage in the resistance members may change according to the change in the resistance of the resistance members.

Figure 4:
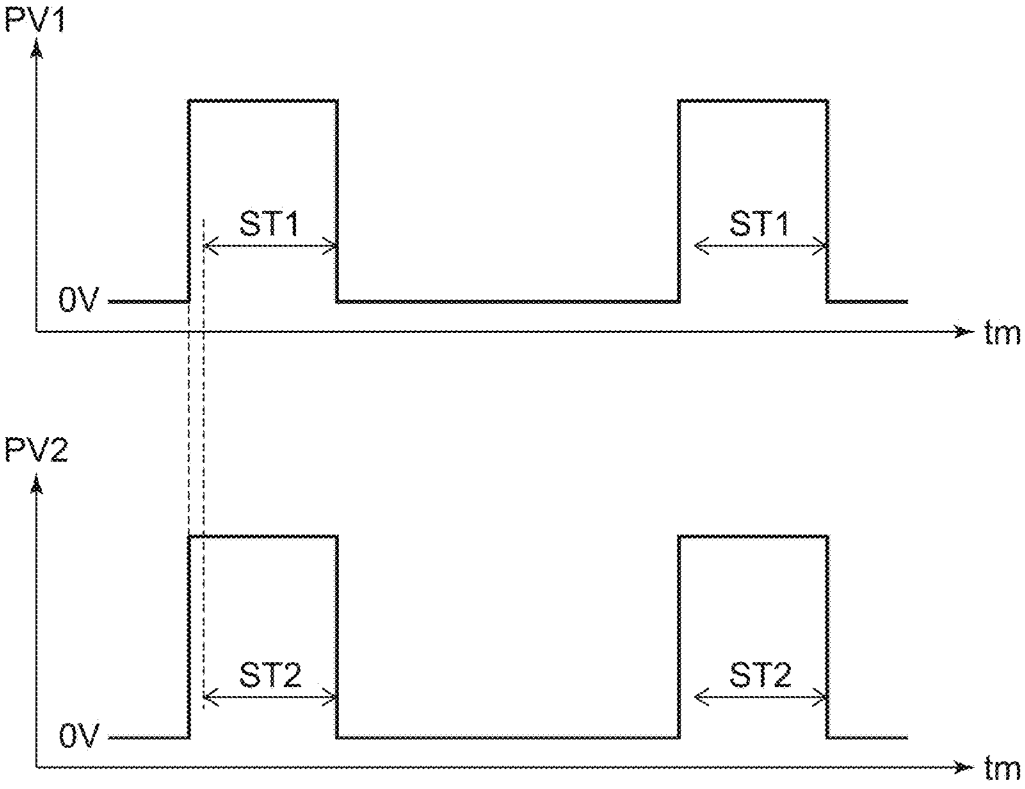
FIG. 4 is a schematic diagram illustrating the operation of the sensor according to the first embodiment.

FIG. 4 is a schematic diagram illustrating the operation of the sensor according to the first embodiment.

FIG. 4 illustrates the first power PV1 supplied to the first conductive member 11*c* and the second power PV2 supplied to the second conductive member 12*c*. In FIG. 4, the horizontal axis is time tm. As already explained, these currents (powers) may be supplied by the detector 70.

As shown in FIG. 4, the detector 70 may supply the first power PV1 to the first conductive member 11*c* in a pulsed manner. The detector 70 may supply the second power PV2 to the second conductive member 12*c* in a pulsed manner.

As shown in FIG. 4, the detector 70 acquires the signal of the first resistance member 11*r* in a first detection period ST1. The detector 70 may perform AD (analog to digital) conversion on the signal in the first detection period ST1. The detector 70 acquires the signal of the second resistance member 12*r* in a second detection period ST2. The detector 70 may perform AD (analog to digital) conversion on the signal in the second detection period ST2.

The detector 70 may detect the difference between the first signal S1 obtained from the first resistance member 11*r* and the second signal S2 obtained from the second resistance member 12*r* in the first detection period ST1. In the first detection period ST1, the difference value may be AD converted.

The detector 70 may detect the difference between the second signal S2 obtained from the second resistance member 12*r* and the third signal S3 obtained from the third resistance member 13*r* in the second detection period ST2. In the second detection period ST2, the difference value may be AD converted.

As shown in FIG. 4, the first power PV1 may be supplied in synchronization with the second power PV2. The first detection period ST1 may be synchronized with the pulse of the first power PV1. The second detection period ST2 may be synchronized with the pulse of the second power PV2.

As shown in FIG. 4, multiple pulses may be provided. The detection operation may be performed repeatedly. The detector 70 may perform a plurality of first operations. The detector 70 may perform a plurality of second operations. The plurality of second operations may be performed in synchronization with the plurality of first operations.

Figure 5:
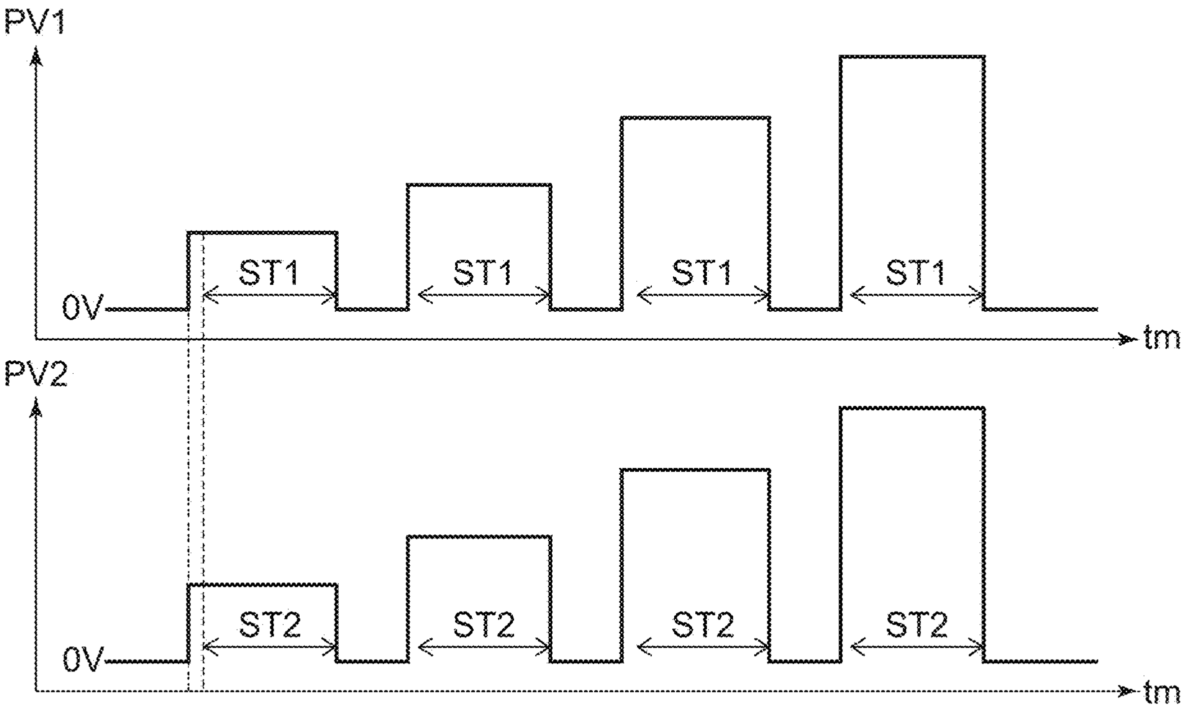
FIG. 5 is a schematic diagram illustrating the operation of the sensor according to the first embodiment.

FIG. 5 is a schematic diagram illustrating the operation of the sensor according to the first embodiment.

FIG. 5 illustrates the first power PV1 and the second power PV2. In FIG. 5, the horizontal axis is time tm. As already explained, these currents (powers) may be supplied by the detector 70. The detector 70 may perform a plurality of first operations. At this time, the detector 70 may change the first power PV1 in the plurality of first operations. For example, the pulse height of the first power PV1 in one of the plurality of first operations is different from the pulse height of the first power PV1 in another one of the plurality of first operations. By changing the first power PV1 in the plurality of first operations, for example, it is possible to easily separate the plurality of detection target gases. For example, it becomes easy to separate and detect a substance that burns at low temperatures and a substance that burns at high temperatures.

For example, the detector 70 may change the second power PV2 in synchronization with the change in the first power PV1. The detector 70 may perform a plurality of second operations. At this time, the detector 70 may change the second power PV2 in the plurality of second operations. For example, the pulse height of the second power PV2 in one of the plurality of second operations is different from the pulse height of the second power PV2 in another one of the plurality of second operations.

Figure 6:
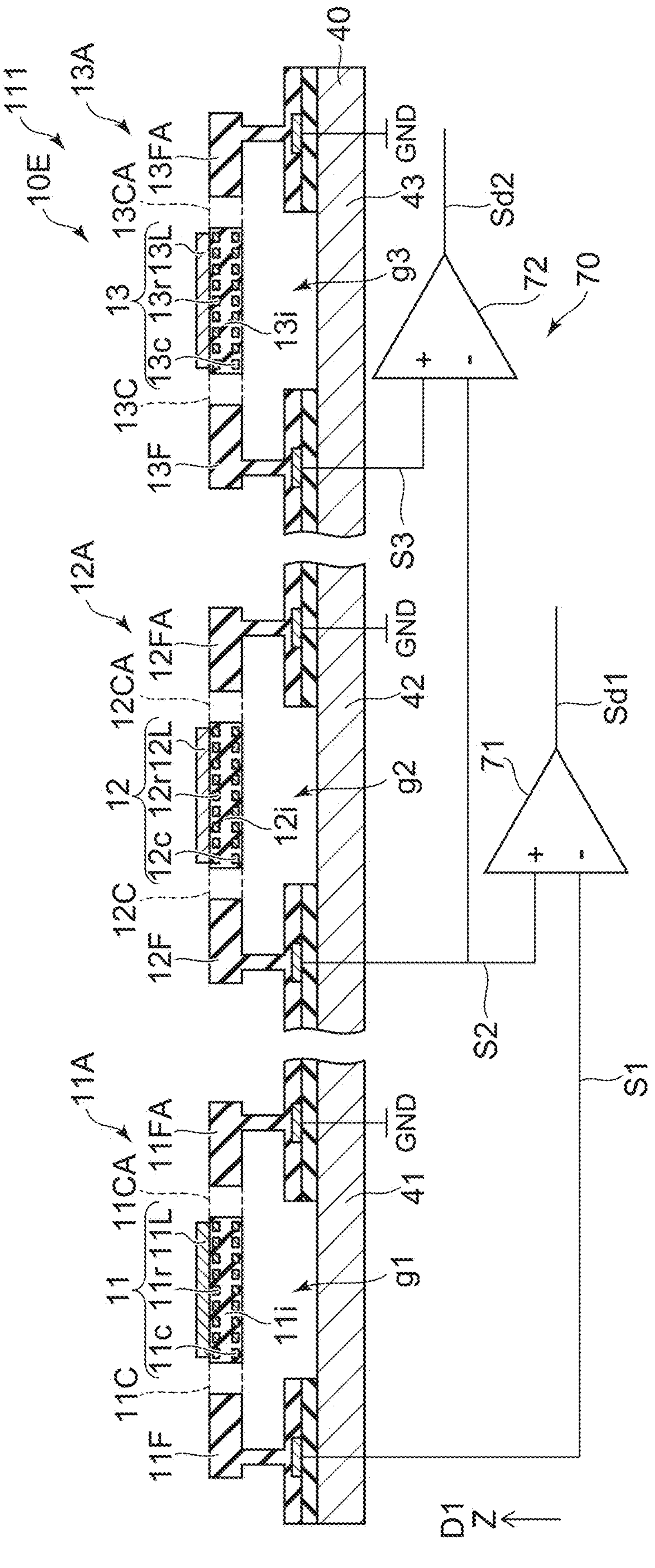
FIG. 6 is a schematic cross-sectional view illustrating a sensor according to the first embodiment.

FIG. 6 is a schematic cross-sectional view illustrating a sensor according to the first embodiment.

As shown in FIG. 6, in a sensor 111 according to the embodiment, the configurations of the second film portion 12 and the third film portion 13 are different from those in the sensor 110. The configuration of the sensor 111 other except for this may be the same as the configuration of the sensor 110.

In the sensor 111, the second film portion 12 includes the second layer 12L. The third film portion 13 includes the third layer 13L. As already explained, the second material of the second layer 12L is different from the first material. The third material of the third layer 13L is the same as the second material. For example, the second material includes Au.

By the second material beings different from the first material, combustion with respect to the detection target is different. Thereby, the first element 11A functions as a combustion type gas sensor, and the second element 12A functions as a heat conduction type gas sensor. The flammability of the first material with respect to the detection target is higher than the flammability of the second material with respect to the detection target. The type of detection target can be effectively separated.

As shown in FIG. 6, the second resistance member 12*r* may be provided between the second region 42 and the second layer 12L. The third resistance member 13*r* may be provided between the third region 43 and the third layer 13L. The second layer 12L and the third layer 13L may be provided on the surface of the film portion.

Figure 7:
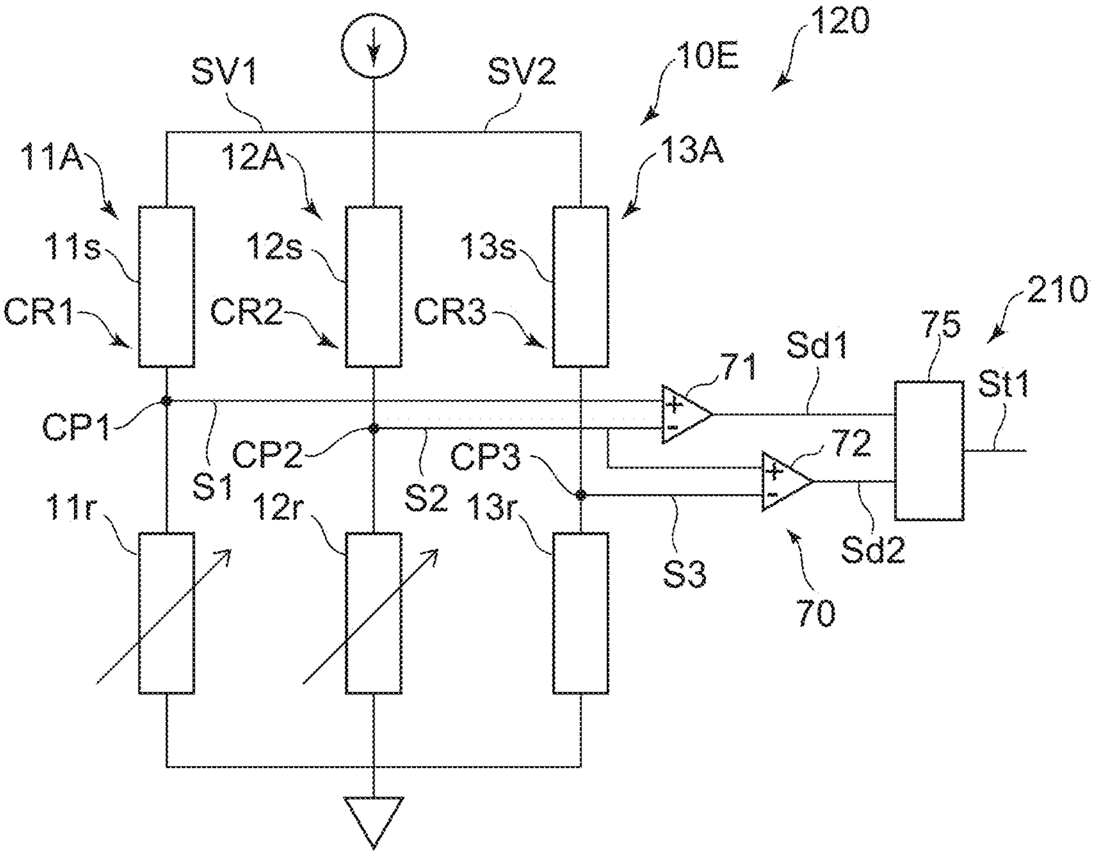
FIG. 7 is a schematic cross-sectional view illustrating a sensor according to the first embodiment.

FIG. 7 is a schematic cross-sectional view illustrating a sensor according to the first embodiment.

As shown in FIG. 7, in a sensor 120 according to the embodiment, the configuration of the element section 10E is different from the configuration of the element section 10E in the sensor 110. The configuration of the sensor 120 except for this may be the same as the configuration of the sensor 110 or the configuration of the sensor 111.

In the sensor 120, the element section 10E includes a first series resistance member 11*s*, a second series resistance member 12*s*, and a third series resistance member 13*s*. The first series resistance member 11*s* is electrically connected in series with the first resistance member 11*r*. The second series resistance member 12*s* is electrically connected in series with the second resistance member 12*r*. The third series resistance member 13*s* is electrically connected in series with the third resistance member 13*r*.

A first circuit CR1 including the first resistance member 11*r* and the first series resistance member 11*s* is electrically connected in parallel with a second circuit CR2 including the second resistance member 12*r* and the second series resistance member 12*s*. A third circuit CR3 including the third resistance member 13*r* and the third series resistance member 13*s* is electrically connected in parallel with the second circuit CR2.

One bridge circuit is formed by the first resistance member 11*r*, the first series resistance member 11*s*, the second resistance member 12*r*, and the second series resistance member 12*s*. One bridge circuit is formed by the second resistance member 12*r*, the second series resistance member 12*s*, the third resistance member 13*r*, and the third series resistance member 13*s*. By detecting the signals obtained from these bridge circuits, the detection target can be detected with high accuracy.

As shown in FIG. 7, the sensor 120 may further include the detector 70. The detector 70 may include the first differential circuit 71 and the second differential circuit 72. The element section 10E may include a first connection point CP1, a second connection point CP2, and a third connection point CP3. The first connection point CP1 is an electrical connection point between the first resistance member 11*r* and the first series resistance member 11*s*. The second connection point CP2 is an electrical connection point between the second resistance member 12*r* and the second series resistance member 12*s*. The third connection point CP3 is an electrical connection point between the third resistance member 13*r* and the third series resistance member 13*s*.

The detector 70 is configured to apply a first detection voltage SV1 to the first circuit CR1 and the second circuit CR2 in the first operation. The detector 70 is configured to apply a second detection voltage SV2 to the second circuit CR2 and the third circuit CR3 in the second operation. The first differential circuit 71 of the detector 70 is configured to output the first differential signal Sd1 corresponding to the first difference between the first signal S1 obtained from the first connection point CP1 and the second signal S2 obtained from the second connection point CP2 in the first operation. The second differential circuit 72 is configured to output the second differential signal Sd2 corresponding to the second difference between the second signal S2 obtained from the second connection point CP2 and the third signal S3 obtained from the third connection point CP3 in the second operation. By the detection using the bridge circuit, detection with higher accuracy can be performed.

Hereinafter, one example regarding the first series resistance member 11*s*, the second series resistance member 12*s*, and the third series resistance member 13*s* will be described.

Figure 8:
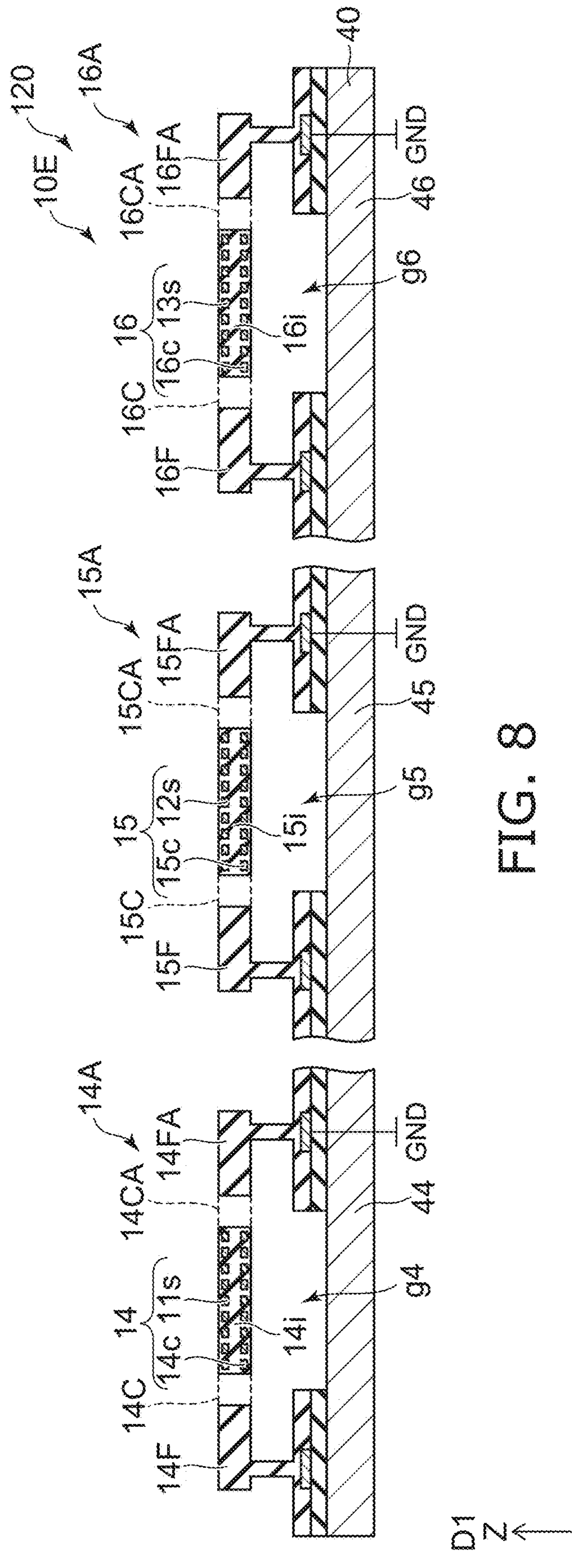
FIG. 8 is a schematic cross-sectional view illustrating the sensor according to the first embodiment.

FIG. 8 is a schematic cross-sectional view illustrating the sensor according to the first embodiment.

Figure 9:
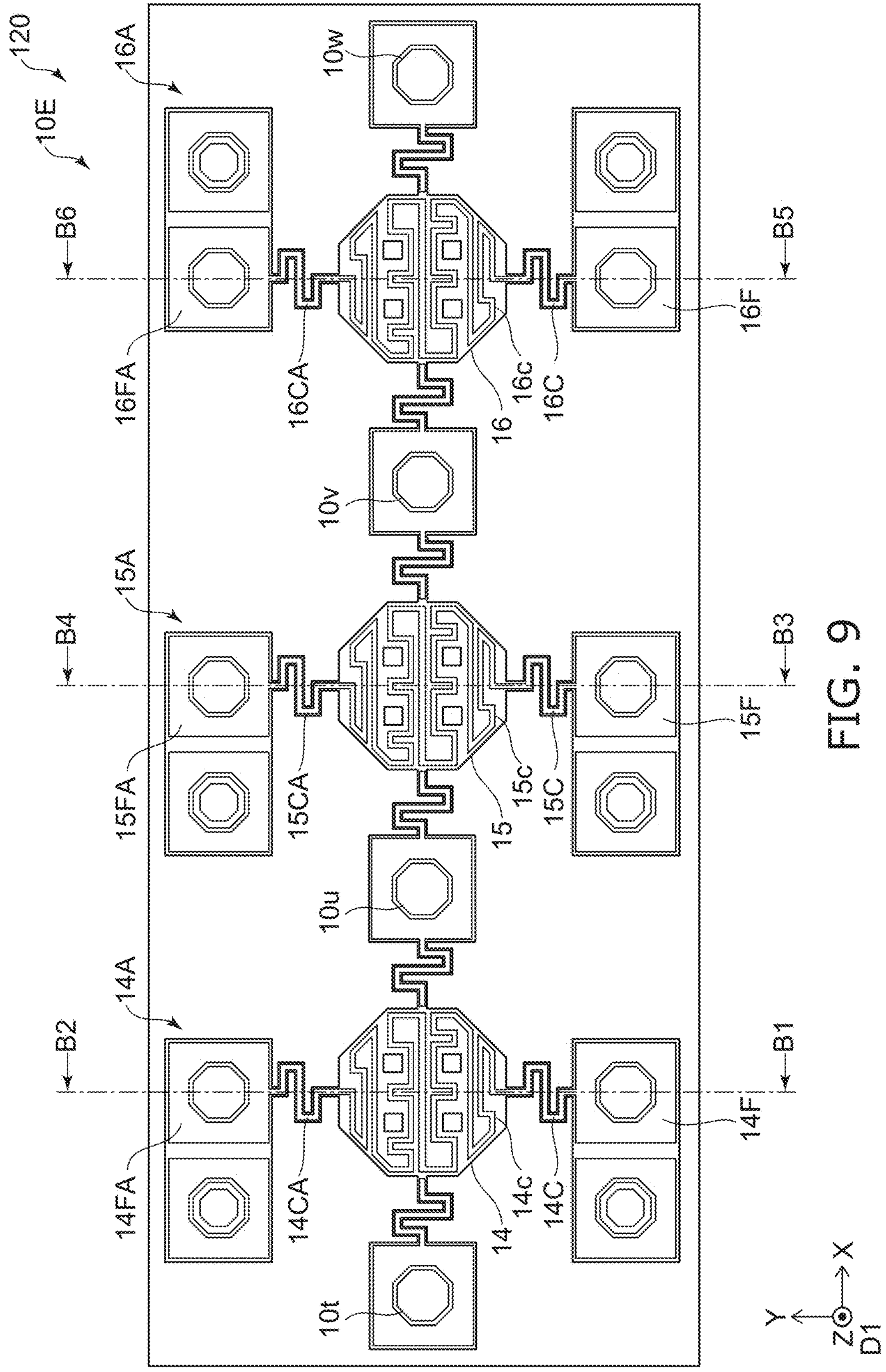
FIG. 9 is a schematic plan view illustrating the sensor according to the first embodiment.
Figure 10:
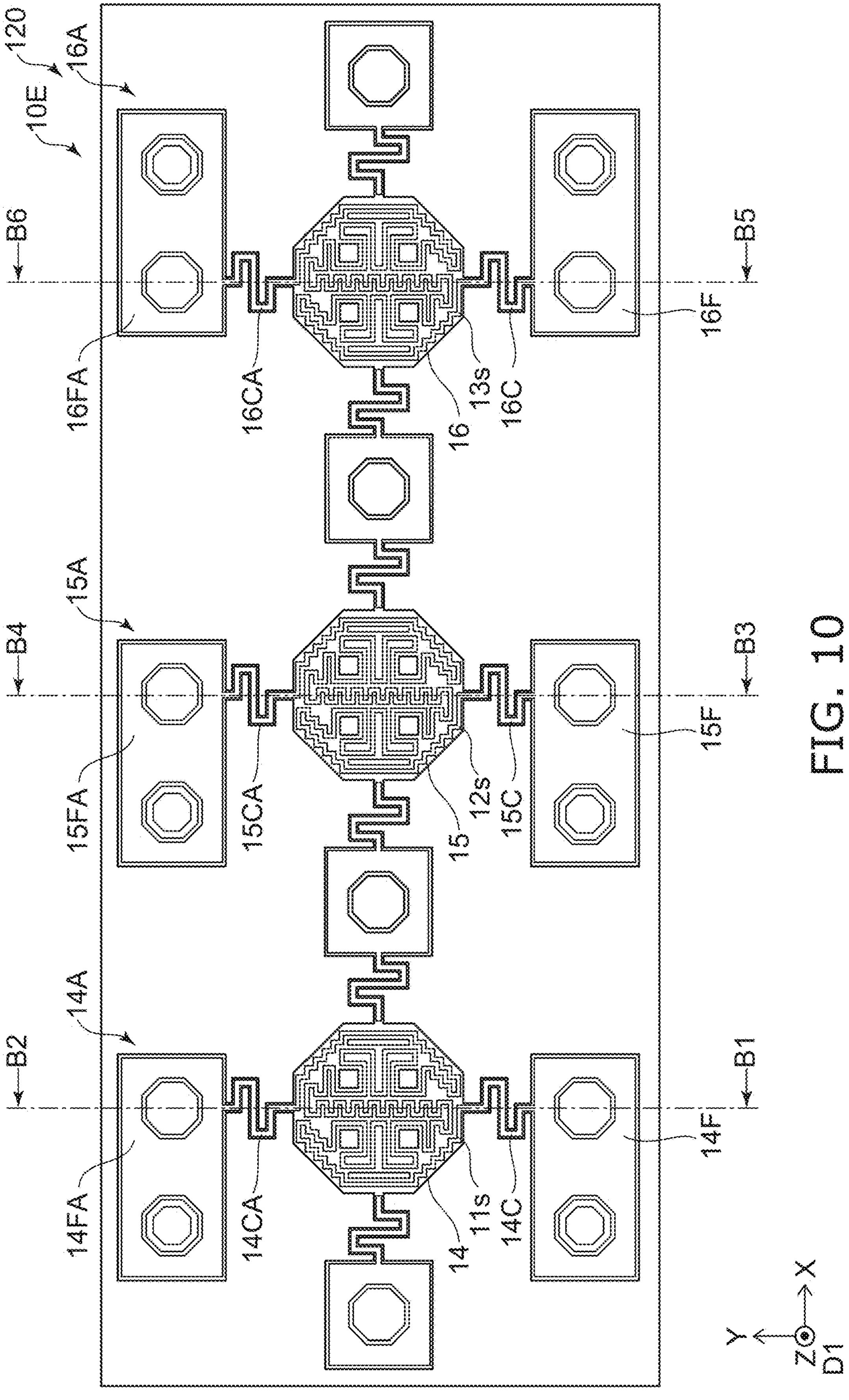
FIG. 10 is a schematic plan view illustrating the sensor according to the first embodiment.

FIGS. 9 and 10 are schematic plan views illustrating the sensor according to the first embodiment.

FIG. 8 illustrates cross sections taken along the B1-B2 line, the B3-B4 line, and the B5-B6 line in FIGS. 9 and 10.

As shown in FIG. 8, for example, the base 40 may further include a fourth region 44, a fifth region 45, and a sixth region 46. The element section 10E further includes a fourth element 14A, a fifth element 15A, and a sixth element 16A. The fourth element 14A is fixed to the fourth region 44. The fifth element 15A is fixed to the fifth region 45. The sixth element 16A is fixed to the sixth region 46. These regions may be mutually continuous or discontinuous.

The fourth element 14A includes a fourth fixed portion 14F fixed to the fourth region 44, and a fourth film portion 14 supported by the fourth fixed portion 14F. The fourth film portion 14 includes the first series resistance member 11*s*. For example, a fourth gap g4 may be provided between the fourth region 44 and the fourth film portion 14.

The fifth element 15A includes a fifth fixed portion 15F fixed to the fifth region 45 and a fifth film portion 15 supported by the fifth fixed portion 15F. The fifth film portion 15 includes the second series resistance member 12*s*. A fifth gap g5 may be provided between the fifth region 45 and the fifth film portion 15.

The sixth element 16A includes a sixth fixed portion 16F fixed to the sixth region 46, and a sixth film portion 16 supported by the sixth fixed portion 16F. The sixth film portion 16 includes the third series resistance member 13*s*. A sixth gap g6 may be provided between the sixth region 46 and the sixth film portion 16.

By the fourth film portion 14, the fifth film portion 15, and the sixth film portion 16 described above, the heat capacities of these film portions become close to the heat capacities of the first film portion 11, the second film portion 12, and the third film portion 13. Detection with higher accuracy is possible.

For example, the fourth film portion 14 may further include a fourth conductive member 14*c*. The fifth film portion 15 may further include a fifth conductive member 15*c*. The sixth film portion 16 may further include a sixth conductive member 16*c*.

As shown in FIG. 8, the fourth film portion 14 may include a fourth insulating member 14*i*. The fourth insulating member 14*i* is provided around the first series resistance member 11*s* and the fourth conductive member 14*c*. The fifth film portion 15 may include a fifth insulating member 15*i*. The fifth insulating member 15*i* is provided around the second series resistance member 12*s* and the fifth conductive member 15*c*. The sixth film portion 16 may include a sixth insulating member 16*i*. The sixth insulating member 16*i* is provided around the third series resistance member 13*s* and the sixth conductive member 16*c*.

The fourth element 14A may include a fourth connect portion 14C. One end of the fourth connect portion 14C is connected to the fourth fixed portion 14F. Another end of the fourth connect portion 14C is connected to the fourth film portion 14. The fifth element 15A may include a fifth connect portion 15C. One end of the fifth connect portion 15C is connected to the fifth fixed portion 15F. Another end of the fifth connect portion 15C is connected to the fifth film portion 15. The sixth element 16A may include a sixth connect portion 16C. One end of the sixth connect portion 16C is connected to the sixth fixed portion 16F. Another end of the sixth connect portion 16C is connected to the sixth film portion 16.

As shown in FIG. 8, the fourth element 14A may include a fourth other fixed portion 14FA and a fourth other connect portion 14CA. The fourth other fixed portion 14FA is fixed to the fourth region 44. One end of the fourth other connect portion 14CA is connected to the fourth other fixed portion 14FA. Another end of the fourth other connect portion 14CA is connected to the fourth film portion 14.

As shown in FIG. 8, the fifth element 15A may include a fifth other fixed portion 15FA and a fifth other connect portion 15CA. The fifth other fixed portion 15FA is fixed to the fifth region 45. One end of the fifth other connect portion 15CA is connected to the fifth other fixed portion 15FA. Another end of the fifth other connect portion 15CA is connected to the fifth film portion 15.

As shown in FIG. 8, the sixth element 16A may include a sixth other fixed portion 16FA and a sixth other connect portion 16CA. The sixth other fixed portion 16FA is fixed to the sixth region 46. One end of the sixth other connect portion 16CA is connected to the sixth other fixed portion 16FA. Another end of the sixth other connect portion 16CA is connected to the sixth film portion 16.

As shown in FIGS. 9 and 10, the fourth film portion 14 may be further supported by a fifth support portion 10*t* and a sixth support portion 10*u*. The fifth film portion 15 may be further supported by the sixth support portion 10*u* and a seventh support portion 10*v*. The sixth film portion 16 may be further supported by the seventh support portion 10*v* and an eighth support portion 10*w*.

As shown in FIGS. 9 and 10, the fourth connect portion 14C, the fifth connect portion 15C, the sixth connect portion 16C, the fourth other connect portion 14CA, the fifth other connect portion 15CA, and the sixth other connect portion 16CA may have a meander structure.

The first series resistance member 11*s*, the second series resistance member 12*s*, and the third series resistance member 13*s* illustrated in FIGS. 8 to 10 may be connected to the first resistance member 11*r*, the second resistance member 12*r*, and the third resistance member 13*r* as illustrated in FIG. 7.

The configuration of the sensor 120 may be the same as the configurations of the sensor 110 and the sensor 111, except for the fourth element 14A, the fifth element 15A, and the sixth element 16A. For example, in the sensor 120, the first film portion 11 may further include the first conductive member 11*c* (see FIG. 1). In the sensor 120, the second film portion 12 may further include the second conductive member 12*c* (see FIG. 1). In the first operation, the detector 70 may supply the first power PV1 to the first conductive member 11*c* and the second power PV2 to the second conductive member 12*c*. In the sensor 120 as well, power does not need to be supplied to the third conductive member 13*c*.

A second embodiment relates to a sensor system 210 (see FIG. 1 or 7). The sensor system 210 includes the above-mentioned sensor (for example, sensor 110, sensor 111, or sensor 120) and communicator 75. The communicator 75 is configured to transmit a signal St1 corresponding to the first difference signal Sd1 and the second difference signal Sd2. The signal St1 may be supplied to the external device by any method such as wireless or wired. For example, detection results can be obtained remotely. For example, control based on the detection results may be performed at a remote location.

The embodiments may include the following Technical proposals:

Technical Proposal 1

A sensor, comprising:
an element section,
the element section including
a base including a first region, a second region and a third region,
a first element fixed to the first region,
a second element fixed to the second region, and
a third element fixed to the third region,
the first element including
a first fixed portion fixed to the first region, and
a first film portion supported by the first fixed portion,
the first film portion including a first resistance member and a first layer including a first material,
the second element including
a second fixed portion fixed to the second region, and
a second film portion supported by the second fixed portion,
the second film portion including a second resistance member,
the third element including
a third fixed portion fixed to the third region, and
a third film portion supported by the third fixed portion,
the third film portion including a third resistance member,
the second film portion and the third film portion satisfying at least one of a first condition or a second condition,
in the first condition, the second film portion and the third film portion not including the first layer,
in the second condition, the second film portion including a second layer, a second material of the second layer being different from the first material, and
in the second condition, the third film portion including a third layer, a third material of the third layer being same as the second material.

Technical Proposal 2

The sensor according to Technical proposal 1, wherein
the first material includes at least one selected from the group consisting of Pt and Pd.

Technical Proposal 3

The sensor according to Technical proposal 2, wherein
the second film portion includes the second layer,
the third film portion includes the third layer, and
the second material includes Au.

Technical Proposal 4

The sensor according to any one of Technical proposals 1-3, further comprising:
a detector,
the detector including a first differential circuit and a second differential circuit,
in a first operation, the first differential circuit being configured to output a first difference signal corresponding to a first difference between a first signal obtained from the first resistance member and a second signal obtained from the second resistance member, and
in a second operation, the second differential circuit being configured to output a second difference signal corresponding to a second difference between the second signal obtained from the second resistance member and a third signal obtained from the third resistance member.

Technical Proposal 5

The sensor according to Technical proposal 4, wherein
the first difference signal is configured to change depending on a concentration of a first gas present around the element section, and
the first gas includes at least one selected from the group consisting of ammonia, methane, and hydrogen.

Technical Proposal 6

The sensor according to Technical proposal 5, wherein
the second difference signal is configured to change depending on a concentration of a second gas present around the element section, and the second gas includes at least one selected from the group consisting of carbon dioxide, ammonia, methane, and hydrogen.

Technical Proposal 7

The sensor according to any one of Technical proposals 4-6, wherein the first film portion further includes a first conductive member, the second film portion further includes a second conductive member, and in the first operation, the detector supplies first power to the first conductive member and supplies second power to the second conductive member.

Technical Proposal 8

The sensor according to Technical proposal 7, wherein the detector supplies the first power to the first conductive member in a pulsed manner, and the detector supplies the second power to the second conductive member in a pulsed manner.

Technical Proposal 9

The sensor according to Technical proposal 8, wherein the detector performs a plurality of the first operations, and the detector changes the first power in the plurality of first operations.

Technical Proposal 10

The sensor according to Technical proposal 8, wherein the detector performs a plurality of the first operations, and a pulse height of the first power in one of the plurality of first operations is different from a pulse height of the first power in another one of the plurality of first operations.

Technical Proposal 11

The sensor according to any one of Technical proposals 7-10, wherein the third film portion further includes a third conductive member, and the detector does not supply power to the third conductive member in the second operation.

Technical Proposal 12

The sensor according to any one of Technical proposals 1-11, wherein the first element is a combustion gas sensor, the second element is a thermally conductive gas sensor, and the third element is a reference sensor.

Technical Proposal 13

The sensor according to any one of Technical proposals 1-12, wherein a first gap is provided between the first region and the first film portion, a second gap is provided between the second region and the second film portion, and a third gap is provided between the third region and the third film portion.

Technical Proposal 14

The sensor according to any one of Technical proposals 1-13, wherein at least a part of the first layer overlaps the first resistance member in a first direction from the first region to the first film portion.

Technical Proposal 15

The sensor according to any one of Technical proposals 1-14, wherein the first resistance member is provided between the first region and the first layer.

Technical Proposal 16

The sensor according to Technical proposal 3, wherein the second resistance member is provided between the second region and the second layer, and the third resistance member is provided between the third region and the third layer.

Technical Proposal 17

The sensor according to any one of Technical proposals 1-3, wherein the element section includes a first series resistance member electrically connected in series with the first resistance member, a second series resistance member electrically connected in series with the second resistance member, and a third series resistance member electrically connected in series with the third resistance member, a first circuit including the first resistance member and the first series resistance member is electrically connected in parallel with a second circuit including the second resistance member and the second series resistance member, and a third circuit including the third resistance member and the third series resistance member is electrically connected in parallel with the second circuit.

Technical Proposal 18

The sensor according to Technical proposal 17, further comprising:

a detector, the element section including a first connection point between the first resistance member and the first series resistance member, a second connection point between the second resistance member and the second series resistance member, and a third connection point between the third resistance member and the third series resistance member, the detector being configured to apply a first detection voltage to the first circuit and the second circuit in a first operation, the detector being configured to apply a second detection voltage to the second circuit and the third circuit in the second operation, the detector including a first differential circuit and a second differential circuit, in the first operation, the first differential circuit being configured to output a first difference signal corresponding to a first difference between a first signal obtained from the first connection point and a second signal obtained from the second connection point, and in the second operation, the second differential circuit being configured to output a second difference signal corresponding to a second difference between the second signal obtained from the second connection point and a third signal obtained from the third connection point.

Technical Proposal 19

The sensor according to Technical proposal 18, wherein the first film portion further includes a first conductive member, the second film portion further includes a second conductive member, and in the first operation, the detector supplies a first power to the first conductive member and supplies a second power to the second conductive member.

Technical Proposal 20

A sensor system, comprising:

the sensor according to Technical proposal 4 or 18; and a communicator configured to transmit a signal corresponding to the first difference signal and the second difference signal.

According to the embodiments, a sensor and a sensor system whose characteristics can be improved can be provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in the sensors and the sensor systems such as bases, regions, element sections, fixed members, connect members, film portions, resistance members, conductive members, controllers, detectors, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all sensors and all sensor systems practicable by an appropriate design modification by one skilled in the art based on the sensors and the sensor systems described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A sensor, comprising:

an element section, the element section including a base including a first region, a second region and a third region, a first element fixed to the first region, a second element fixed to the second region, and a third element fixed to the third region, the first element including a first fixed portion fixed to the first region, and a first film portion supported by the first fixed portion, the first film portion including a first resistance member and a first layer including a first material, the second element including a second fixed portion fixed to the second region, and a second film portion supported by the second fixed portion, the second film portion including a second resistance member, the third element including a third fixed portion fixed to the third region, and a third film portion supported by the third fixed portion, the third film portion including a third resistance member, the second film portion and the third film portion satisfying at least one of a first condition or a second condition, in the first condition, the second film portion and the third film portion not including the first layer, in the second condition, the second film portion including a second layer, a second material of the second layer being different from the first material, and in the second condition, the third film portion including a third layer, a third material of the third layer being same as the second material.

2. The sensor according to claim 1, wherein the first material includes at least one selected from the group consisting of Pt and Pd.

3. The sensor according to claim 2, wherein the second film portion includes the second layer, the third film portion includes the third layer, and the second material includes Au.

4. The sensor according to claim 3, wherein the second resistance member is provided between the second region and the second layer, and the third resistance member is provided between the third region and the third layer.

5. The sensor according to claim 1, further comprising:

a detector, the detector including a first differential circuit and a second differential circuit, in a first operation, the first differential circuit being configured to output a first difference signal corresponding to a first difference between a first signal obtained from the first resistance member and a second signal obtained from the second resistance member, and in a second operation, the second differential circuit being configured to output a second difference signal corresponding to a second difference between the second signal obtained from the second resistance member and a third signal obtained from the third resistance member.

6. The sensor according to claim 5, wherein the first difference signal is configured to change depending on a concentration of a first gas present around the element section, and the first gas includes at least one selected from the group consisting of ammonia, methane, and hydrogen.

7. The sensor according to claim 6, wherein the second difference signal is configured to change depending on a concentration of a second gas present around the element section, and the second gas includes at least one selected from the group consisting of carbon dioxide, ammonia, methane, and hydrogen.

8. The sensor according to claim 5, wherein the first film portion further includes a first conductive member, the second film portion further includes a second conductive member, and in the first operation, the detector supplies first power to the first conductive member and supplies second power to the second conductive member.

9. The sensor according to claim 8, wherein the detector supplies the first power to the first conductive member in a pulsed manner, and the detector supplies the second power to the second conductive member in a pulsed manner.

10. The sensor according to claim 9, wherein the detector performs a plurality of the first operations, and the detector changes the first power in the plurality of first operations.

11. The sensor according to claim 9, wherein the detector performs a plurality of the first operations, and a pulse height of the first power in one of the plurality of first operations is different from a pulse height of the first power in another one of the plurality of first operations.

12. The sensor according to claim 8, wherein the third film portion further includes a third conductive member, and the detector does not supply power to the third conductive member in the second operation.

13. A sensor system, comprising:

the sensor according to claim 5; and a communicator configured to transmit a signal corresponding to the first difference signal and the second difference signal.

14. The sensor according to claim 1, wherein the first element is a combustion gas sensor, the second element is a thermally conductive gas sensor, and the third element is a reference sensor.

15. The sensor according to claim 1, wherein a first gap is provided between the first region and the first film portion, a second gap is provided between the second region and the second film portion, and a third gap is provided between the third region and the third film portion.

16. The sensor according to claim 1, wherein at least a part of the first layer overlaps the first resistance member in a first direction from the first region to the first film portion.

17. The sensor according to claim 1, wherein the first resistance member is provided between the first region and the first layer.

18. The sensor according to claim 1, wherein the element section includes a first series resistance member electrically connected in series with the first resistance member, a second series resistance member electrically connected in series with the second resistance member, and a third series resistance member electrically connected in series with the third resistance member, a first circuit including the first resistance member and the first series resistance member is electrically connected in parallel with a second circuit including the second resistance member and the second series resistance member, and a third circuit including the third resistance member and the third series resistance member is electrically connected in parallel with the second circuit.

19. The sensor according to claim 18, further comprising:

a detector, the element section including a first connection point between the first resistance member and the first series resistance member, a second connection point between the second resistance member and the second series resistance member, and a third connection point between the third resistance member and the third series resistance member, the detector being configured to apply a first detection voltage to the first circuit and the second circuit in a first operation, the detector being configured to apply a second detection voltage to the second circuit and the third circuit in the second operation, the detector including a first differential circuit and a second differential circuit, in the first operation, the first differential circuit being configured to output a first difference signal corresponding to a first difference between a first signal obtained from the first connection point and a second signal obtained from the second connection point, and in the second operation, the second differential circuit being configured to output a second difference signal corresponding to a second difference between the second signal obtained from the second connection point and a third signal obtained from the third connection point.

20. The sensor according to claim 19, wherein the first film portion further includes a first conductive member, the second film portion further includes a second conductive member, and in the first operation, the detector supplies a first power to the first conductive member and supplies a second power to the second conductive member.

* * * * *